(12) United States Patent
Hu et al.

(10) Patent No.: US 11,567,598 B2
(45) Date of Patent: Jan. 31, 2023

(54) DISPLAY PANEL AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xuwu Hu, Beijing (CN); Yangsheng Liu, Beijing (CN); Hwang Kim, Beijing (CN); Wei Lin, Beijing (CN)

(73) Assignees: CHENGDU BOE OPTOELECTRONICS TECHNOLOGY CO., LTD. CHENGDU, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/488,407

(22) Filed: Sep. 29, 2021

(65) Prior Publication Data

US 2022/0129098 A1    Apr. 28, 2022

(30) Foreign Application Priority Data

Oct. 22, 2020   (CN) .......................... 202011137662.5

(51) Int. Cl.
*G06F 3/041* (2006.01)
*G06F 3/044* (2006.01)

(52) U.S. Cl.
CPC .......... *G06F 3/0412* (2013.01); *G06F 3/0448* (2019.05)

(58) Field of Classification Search
CPC ...... G06F 3/0412; G06F 3/0448; G06F 3/044; G06F 3/0443; G06F 2203/04103; G06F 2203/04102
See application file for complete search history.

(56) References Cited

U.S. PATENT DOCUMENTS

2020/0173949 A1   6/2020 Lee et al.
2020/0175901 A1*  6/2020 Lee ..................... G06F 3/04164
(Continued)

FOREIGN PATENT DOCUMENTS

| CN | 111106151 | 5/2020 |
| CN | 111128064 | 5/2020 |
| CN | 112256150 | 1/2021 |

OTHER PUBLICATIONS

PCT International Search Report and Written Opinion (with English translation) for corresponding PCT Application No. PCT/CN2021/094251, 16 pages.

*Primary Examiner* — Amit Chatly
(74) *Attorney, Agent, or Firm* — Dority & Manning, P.A.

(57) ABSTRACT

A display panel has a mounting hole. The display panel includes a first conductive layer, a second conductive layer, and a first insulating isolation layer located between the first conductive layer and the second conductive layer. The first conductive layer includes a first crack detection line and a first electrode connected to each other. The second conductive layer includes a second crack detection line and a second electrode connected to each other. The first electrode and the second electrode constitute a capacitor. The mutual-sensing capacitor is disposed outside of the mounting hole. The capacitor is configured to detect whether there is a crack in a portion of the display panel located around the mounting hole.

20 Claims, 17 Drawing Sheets

(56) References Cited

U.S. PATENT DOCUMENTS

| | | | |
|---|---|---|---|
| 2020/0249796 A1* | 8/2020 | Hara | ..................... G06F 3/0446 |
| 2020/0265783 A1 | 8/2020 | Lee et al. | |
| 2020/0273919 A1 | 8/2020 | Ding et al. | |
| 2020/0278312 A1* | 9/2020 | Jeong | ................. G01R 31/2837 |
| 2021/0375173 A1 | 12/2021 | Wang et al. | |
| 2021/0405815 A1 | 12/2021 | Deng et al. | |

* cited by examiner

DISPLAY PANEL AND DISPLAY APPARATUS

This application claims priority to Chinese Patent Application No. 202011137662.5, filed on Oct. 22, 2020, which is incorporated herein by reference in its entirety.

TECHNICAL FIELD

The present disclosure relates to the field of display technologies, and in particular, to a display panel and a display apparatus.

BACKGROUND

At present, display screens are moving towards an era of full screens. In order to increase a screen-to-body ratio (i.e., a ratio of an area of a display screen to an area of a front panel of a display apparatus including the display screen), most products are equipped with an AA Hole technology, in which holes are punched in an active area AA (i.e., display area) to place optical devices in the holes. The AA Hole technology requires punching holes in active areas of a display screen motherboard firstly, and then cutting the display screen motherboard to obtain multiple display screens with the holes.

SUMMARY

In an aspect, a display panel is provided, having a mounting hole. The display panel includes a first conductive layer, a second conductive layer, and a first insulating isolation layer. The first conductive layer includes a first crack detection line and a first electrode connected to each other. The second conductive layer includes a second crack detection line and a second electrode connected to each other. The first insulating isolation layer is located between the first conductive layer and the second conductive layer. The first electrode and the second electrode constitute a capacitor. The capacitor is disposed outside of the mounting hole. The capacitor is configured to detect whether there is a crack in a portion of the display panel located around the mounting hole.

In some embodiments, the capacitor surrounds at least a part of the mounting hole.

In some embodiments, the first electrode has a shape of a ring and surrounds the mounting hole, or the first electrode has a shape of an opening ring and surrounds a part of the mounting hole.

In some embodiments, the second electrode has a shape of a ring and surrounds the mounting hole, or the second electrode has a shape of an opening ring and surrounds part of the mounting hole.

In some embodiments, one end of the first crack detection line is connected to the first electrode, and another end extends in a direction away from the first electrode. One end of the second crack detection line is connected to the second electrode, and another end extends in a direction away from the second electrode. In a direction perpendicular to a plane where the display panel is located, the first crack detection line is non-overlapping with the second crack detection line.

In some embodiments, the first crack detection line surrounds at least a part of the mounting hole. The first crack detection line is located at a side of the capacitor away from the mounting hole.

In some embodiments, the second crack detection line surrounds at least a part of the mounting hole. The second crack detection line is located at a side of the capacitor away from the mounting hole.

In some embodiments, the first crack detection line surrounds a part of the mounting hole, and the second crack detection line surrounds another part of the mounting hole.

In some embodiments, in a direction perpendicular to a plane where the display panel is located, the first crack detection line is partially overlapped with the second crack detection line.

In some embodiments, the display panel further includes at least one first isolation dam surrounding the mounting hole. The first isolation dam is located at a side of the capacitor away from the mounting hole. A part of the first crack detection line and a part of the second crack detection line extend from a side of the first isolation dam proximate to the mounting hole to a side of the first isolation dam away from the mounting hole.

In some embodiments, in a direction perpendicular to a plane where the display panel is located, a cross-sectional pattern of the first isolation dam is a trapezoid. The first isolation dam includes a plurality of first isolation dams, a thickness of a first isolation dam proximate to the mounting hole is greater than a thickness of a first isolation dam away from the mounting hole.

In some embodiments, the display panel further includes at least one second isolation dam surrounding the mounting hole. The second isolation dam is located at the side of the first isolation dam proximate to the mounting hole.

In some embodiments, in a direction perpendicular to a plane where the display panel is located, a cross-sectional pattern of the second isolation dam is inverted trapezoidal-shaped or I-shaped.

In some embodiments, the first electrode and the second electrode both cover at least a part of the second isolation dam.

In some embodiments, the display panel further includes a display substrate.

The display substrate includes an encapsulation layer and a touch structure located at a side of the encapsulation layer. The touch structure includes a first touch layer, a second insulating isolation layer, and a second touch layer that are sequentially stacked.

In some embodiments, the first conductive layer and the first touch layer are disposed in a same layer. The first insulating isolation layer and the second insulating isolation layer are disposed in a same layer. The second conductive layer and the second touch layer are disposed in a same layer.

In another aspect, a display apparatus is provided, including the display panel according to any one of the embodiments.

In some embodiments, the display apparatus further includes two pads. An end of the first crack detection line away from the first electrode is electrically connected to one of the pads, and an end of the second crack detection line away from the second electrode is electrically connected to another one of the pads.

In some embodiments, the display apparatus further includes an optical device located in the mounting hole of the display panel.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products to which the embodiments of the present disclosure relate.

DETAILED DESCRIPTION

Figure 1:
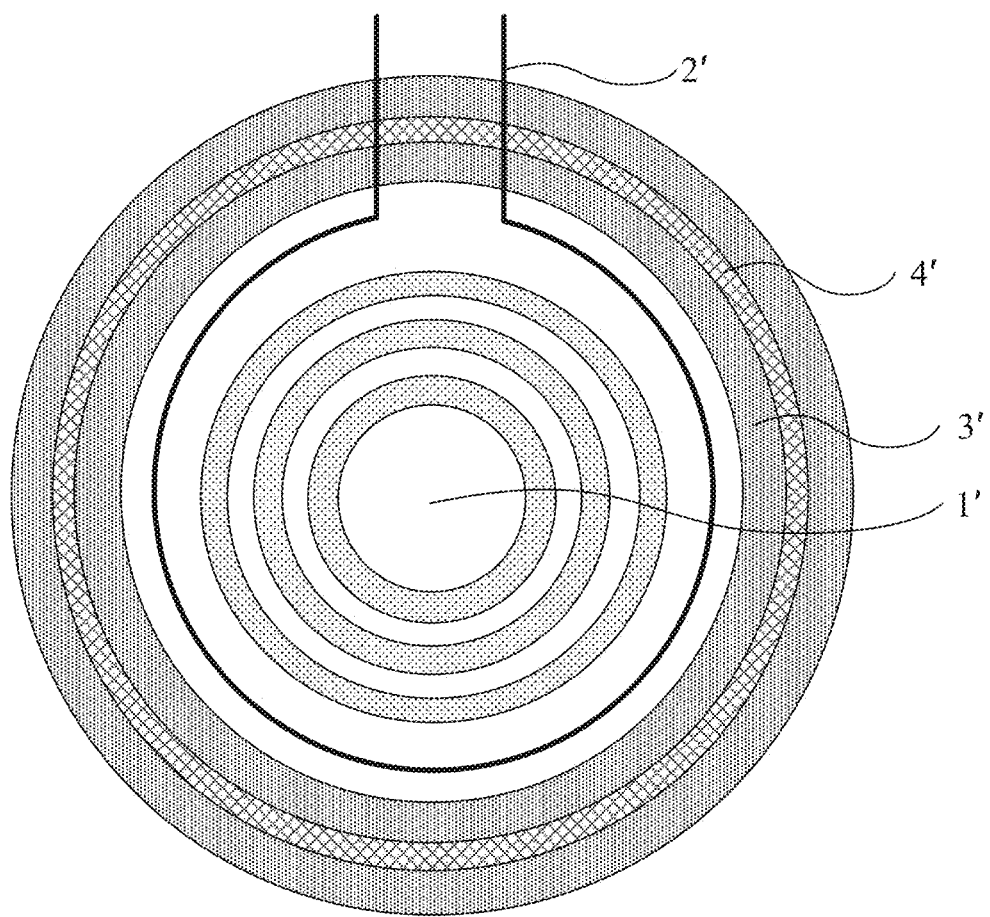
FIG. 1 is a partial structural diagram of a display panel in an example.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art on the basis of the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description of the specification, terms "one embodiment", "some embodiments", "exemplary embodiments", "an example", "a specific example" or "some examples" and the like are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials, or characteristics may be included in any one or more embodiments or examples in any suitable manner.

Hereinafter, terms such as "first" and "second" are only used for descriptive purposes, and are not to be construed as indicating or implying relative importance or implicitly indicating the number of indicated technical features. Thus, features defined as "first" or "second" may explicitly or implicitly include one or more of the features. As used in this specification and the appended claims, the singular forms "a/an" and "the" may also include plural referents unless the content clearly dictates otherwise. In the description of the embodiments of the present disclosure, the term "a plurality of/the plurality of" means two or more unless otherwise specified.

In the description of some embodiments, the term such as "connected" and its derivative extensions may be used. For example, the term "connected" may be used in the description of some embodiments to indicate that two or more components are in direct physical contact or electrical contact with each other. The embodiments disclosed herein are not necessarily limited to the contents herein.

The phrase "A and/or B" includes the following three combinations: only A, only B, and a combination of A and B.

The use of the phrase "configured to" herein means an open and inclusive language, which does not exclude devices that are configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about", "substantially" or "approximately" as used herein includes a stated value and an average value within an acceptable range of deviation of a particular value. The acceptable range of deviation is, for example, determined by a person of ordinary skill in the art, in view of the measurement in question and errors associated with measurement of a particular quantity (i.e., limitation of a measurement system).

Exemplary embodiments are described herein with reference to sectional views and/or plan views as idealized exemplary drawings. In the accompanying drawings, thickness of layers and regions may be exaggerated for clarity. Therefore, variations in shape with respect to the drawings due to, for example, manufacturing techniques and/or tolerances may be conceivable. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of the region in a device, and are not intended to limit the scope of the exemplary embodiments.

The embodiments of the present invention are described below in detail. Examples of the embodiments are illustrated in the accompanying drawings, wherein same or similar marks from beginning to end indicate same or similar elements, or elements with same or similar functions. The following embodiments described by referring to the accompanying drawings are exemplary for the purpose of explaining the present invention, and shall not be understood as limitations on the present invention.

Figure 2A:
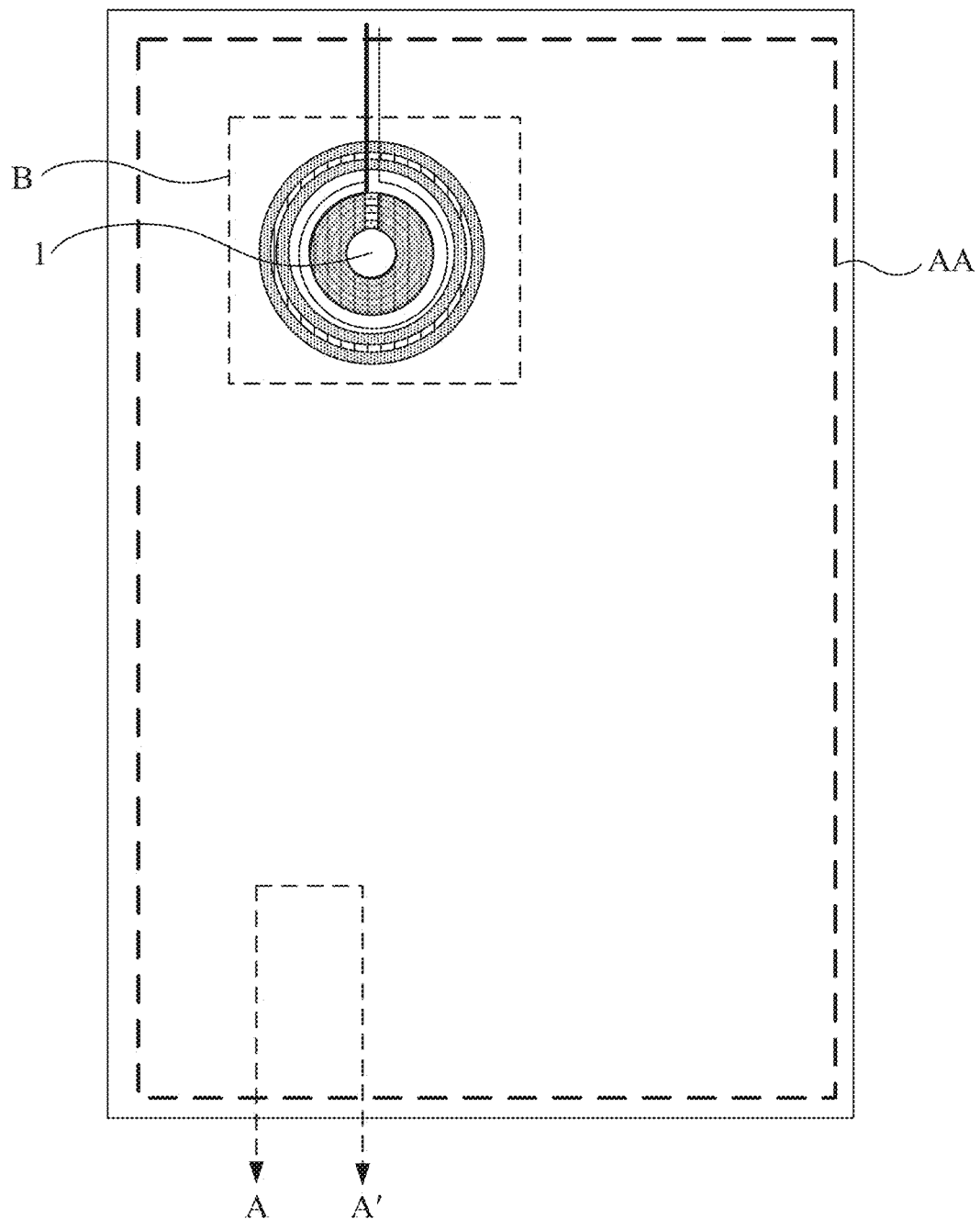
FIG. 2A is a structural diagram of a display panel, in accordance with some embodiments of the present disclosure.

As shown in FIG. 2A, embodiments of the present disclosure provide a display panel 100. The display panel 100 has a mounting hole 1.

The embodiments of the present disclosure do not limit the type of the mounting hole 1, which may be selected according to actual needs.

For example, the mounting hole 1 may be a through hole which penetrates the display panel 100.

For another example, the mounting hole 1 may be a blind hole which does not penetrate the display panel 100. The opening of the blind hole is in a surface of the display panel 100, e.g., a back face of the display panel 100 (i.e., non-display face).

The embodiments of present disclosure do not limit the number of the mounting holes 1, which may be selected according to actual needs.

For example, there may be at least one mounting hole 1. In a case where there are more than two mounting holes 1, shapes of the mounting holes 1 may be the same or different.

As shown in FIG. 2A, the embodiments of present disclosure are schematically illustrated by considering an example in which there is one mounting hole 1 having a circular shape.

For example, as shown in FIG. 2A, the display panel 100 has an active area (i.e., display area) AA.

The display area AA may be of a variety of types, which is not limited in the embodiments of present disclosure, and details may be set according to actual needs.

For example, the shape of the display area AA may be any one of an ellipse, a trapezoid, and a rectangle.

For example, as shown in FIG. 2A, the present disclosure is described by considering an example in which the shape of the display area AA is a rectangle.

For example, as shown in FIG. 2A, the mounting hole 1 is located in the display area AA. Furthermore, the mounting hole 1 may be located at an upper left corner of the display area AA.

Figure 5:
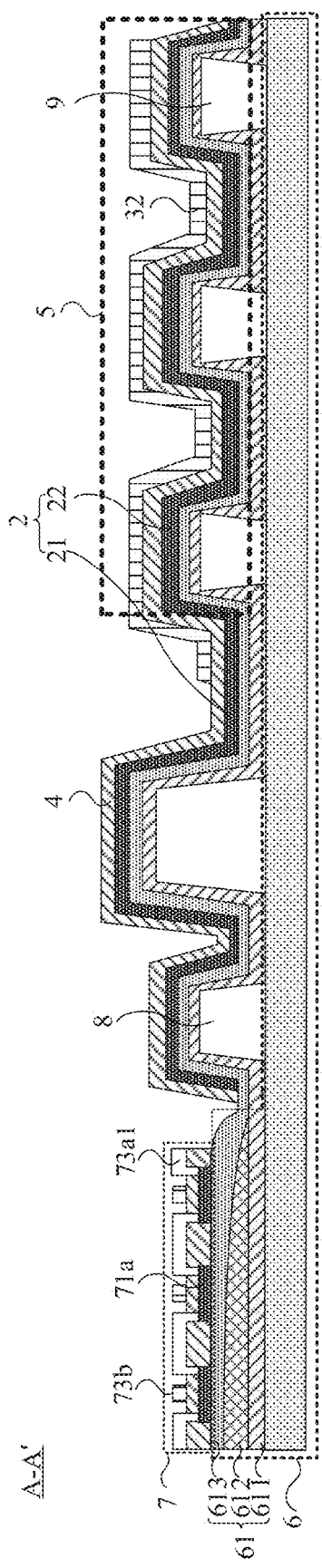
FIG. 5 is another sectional view of the region B in the display panel shown in FIG. 3 taken along the line A-A'.

In some examples, as shown in FIG. 5, the display panel 100 further includes a display substrate 6.

Figure 2B:
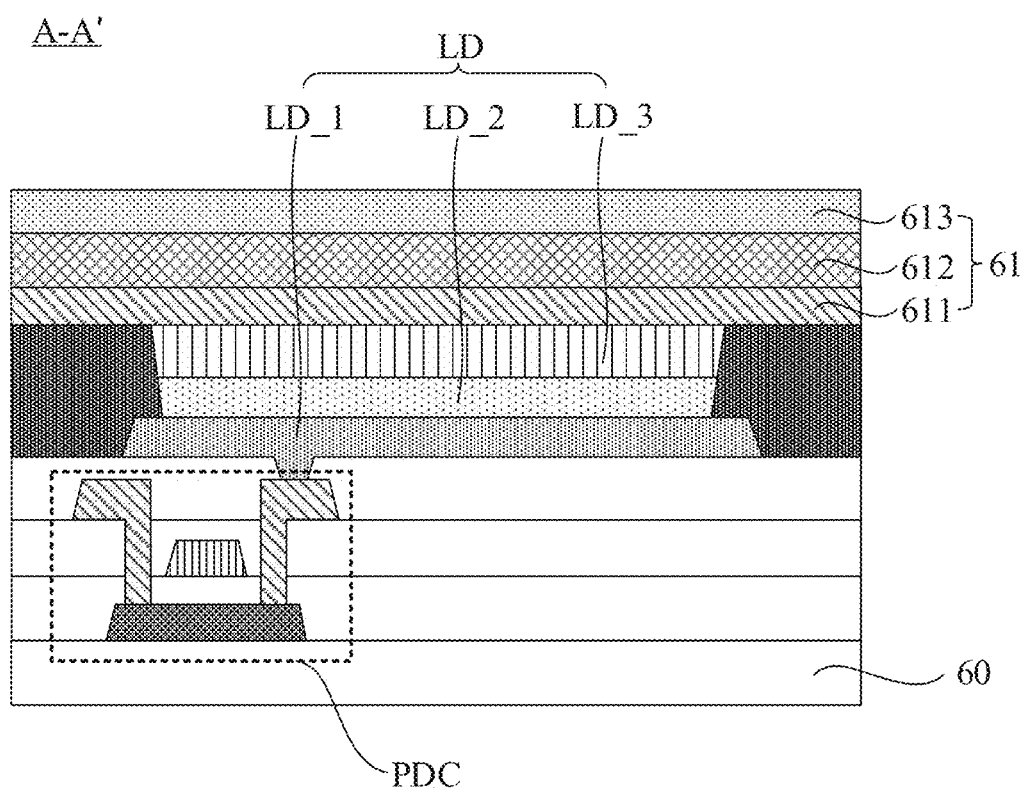
FIG. 2B is a sectional view of the display panel shown in FIG. 2A taken along the line A-A'.

For example, as shown in FIG. 2B, the display substrate 6 includes a base 60 and a plurality of pixel driving circuits PDC disposed on the base 60.

The base 60 is of a variety of structures, which may be selected and set according to actual needs.

For example, the base may 60 be a rigid base. The rigid base may be, for example, a glass base or a polymethyl methacrylate (PMMA) base. In this case, the display substrate 6 may be a rigid display substrate.

For another example, the base 60 may be a flexible base. The flexible base may be, for example, a polyethylene terephthalate (PET) base, a polyethylene naphthalate (PEN) base, or a polyimide (PI) base. In this case, the display substrate 6 may be a flexible display substrate, which may be bent or folded.

The pixel driving circuit PDC may be of a variety of structures, which may be selected and set according to actual needs. For example, the pixel driving circuit PDC may be of "2T1C", "6T1C", "7T1C", "6T2C" or "7T2C" structure. Here, "T" represents a thin film transistor, and the number before "T" represents the number of thin film transistors in the pixel driving circuit PDC; "C" represents a storage capacitor, and the number before "C" represents the number of storage capacitors in the pixel driving circuit PDC.

For example, the display substrate 6 further includes light-emitting devices LD disposed at a side of the pixel driving circuit PDC away from the base 60.

For example, the light-emitting device LD includes an anode LD_1, a light-emitting layer LD_2, and a cathode LD_3 that are sequentially stacked.

For example, as shown in FIGS. 4 to 7, the display substrate 6 further includes an encapsulation layer 61 disposed at a side of the light-emitting device LD away from the base 60.

For example, the encapsulation layer 61 may cover the plurality of light-emitting devices LD, so as to prevent external water and/or oxygen from invading the light-emitting devices LD, and prevent the light-emitting devices LD from being corroded, thereby increasing the service life of the light-emitting devices LD.

For example, as shown in FIGS. 4 to 7, the encapsulation layer 61 includes a first inorganic layer 611, an organic layer 612, and a second inorganic layer 613 that are sequentially stacked.

It will be understood that, in order to prevent the water and/or the oxygen from invading the inside of the display substrate 6 (e.g., the light-emitting devices LD in the display substrate 6) through the mounting hole 1, the encapsulation layer 61 is further located in a region around the mounting hole 1. Since in a process of forming the display panel 100, a hole needs to be punched at a position of the mounting hole 1 to be formed, a portion of the display panel 100 located around the mounting hole 1 is prone to be subject to a large stress, resulting in a risk of a crack in the portion of the display panel 100 located around the mounting hole 1 (e.g., including the encapsulation layer 61), thereby causing the external water and/or the oxygen to easily pass through the crack and corrode the light-emitting devices LD. Therefore, in the process of forming the display panel 100, it is necessary to strengthen a detection of the crack in the portion of the display panel 100 located around the mounting hole 1, so as to be able to warn and adjust the process in advance to avoid loss.

Figure 3:
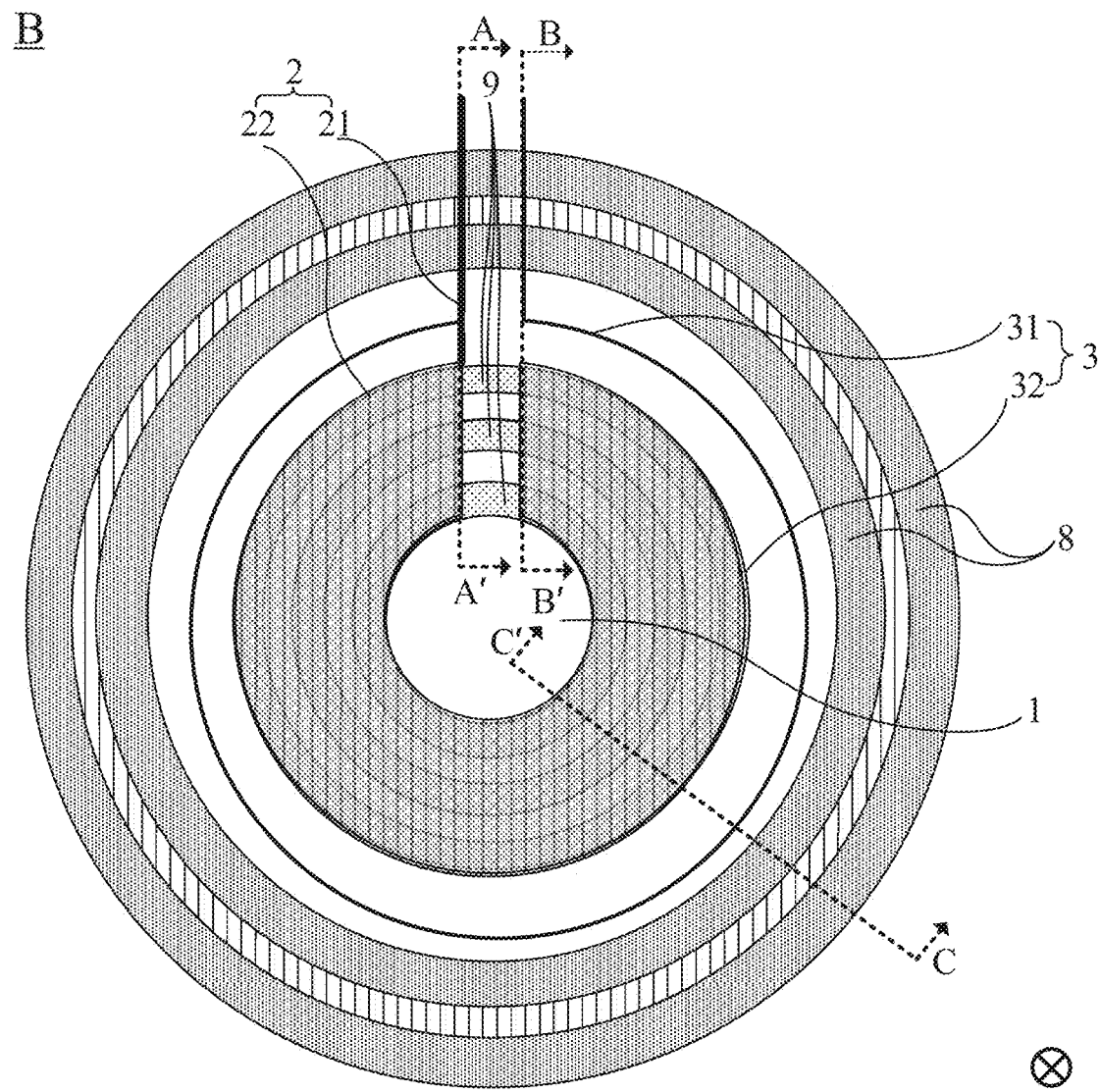
FIG. 3 is an enlarged view of a region B in the display panel shown in FIG. 2A.

On this basis, in some embodiments of the present disclosure, a display panel 100 is provided. As shown in FIGS. 2A, 3 and 5, the display panel 100 includes a first conductive layer 2, a second conductive layer 3 and a first insulating isolation layer 4. The first conductive layer 2 includes a first crack detection line 21 and a first electrode 22 connected to each other. The second conductive layer 3 includes a second crack detection line 31 and a second electrode 32 connected to each other. The first insulating isolation layer 4 is located between the first conductive layer 2 and the second conductive layer 3. The first electrode 22 and the second electrode 32 constitute a capacitor (mutual-sensing capacitor) 5. The mutual-sensing capacitor 5 is disposed outside of the mounting hole 1, and the mutual-sensing capacitor is configured to detect whether there is a crack in a portion of the display panel 100 located around the mounting hole 1.

It will be noted that, in a case where there is a crack in the portion of the display panel 100 around the mounting hole 1, since the mutual-sensing capacitor 5 is arranged near the mounting hole 1, there will also be a crack in the mutual-sensing capacitor 5. In this case, by transmitting a detection signal to the mutual-sensing capacitor 5 and receiving a detection signal passing through the mutual-sensing capacitor 5, and detecting the detection signal passing through the mutual-sensing capacitor 5, it may be determined whether there is a crack in the portion of the display panel 100 located around the mounting hole 1.

For example, the first insulating isolation layer 4 may be used as an insulating medium disposed between the first conductive layer 2 and the second conductive layer 3, and is mainly used to isolate the first electrode 22 and the second electrode 32, and isolate the first crack detection line 21 and the second crack detection line 31, so as to prevent an electrical connection, which may cause a short circuit problem, between the first conductive layer 2 and the second conductive layer 3.

For example, the first electrode 22 and the second electrode 32 may be used as conductive plates arranged in the display panel 100, which are mainly used to constitute the upper and lower plates of the mutual-sensing capacitor 5. The embodiments of the present disclosure do not limit the material for making the two electrodes. For example, the two electrodes may be made of a metal material, such as copper (Cu), aluminum (Al), magnesium (Mg), silver (Ag) or alloy thereof; or the two electrodes may be made of a transparent metal oxide material, such as indium tin oxide (ITO), indium zinc oxide (IZO), fluorine-doped tin dioxide (FTO) or the like, so that an under panel camera (UPC) technology may be applied to the display panel 100, thereby further increasing the screen ratio of the display panel 100.

For example, the first crack detection line 21 and the second crack detection line 31 may be used as wires arranged in the display panel 100, which are mainly used for signal transmission. One end of the first crack detection line 21 is electrically connected to the first electrode 22, and one end of the second crack detection line 31 is electrically connected to the second electrode 32.

For example, the other end of the first crack detection line 21 may receive the detection signal and transmit the detection signal to the first electrode 22. The detection signal may be transmitted to the second crack detection line 31 through the second electrode 32 and output through the other end of the second crack detection line 31.

For example, the first crack detection line 21 and the second crack detection line 31 are metal wires.

It will be noted that, in the case where there is a crack in the portion of the display panel 100 located around the mounting hole 1, there may also be crack(s) in the first crack detection line 21 and the second crack detection line 31 disposed at the side of the mounting hole 1, so that the detection signal cannot be transmitted and thus cannot be obtained. Therefore, by determining whether the detection signal may be obtained, it may be determined whether there is a crack in the portion of the display panel 100 located around the mounting hole 1.

Therefore, in the embodiments of the present disclosure, the display panel 100 is provided. By providing the first electrode 22 and the second electrode 32 opposite to each other, the mutual-sensing capacitor 5 is formed, and by providing the first crack detection line 21 connected to the first electrode 22 and the second crack detection line 31 connected to the second electrode 32, the first crack detection line 21 may be used to transmit the detection signal to the mutual-sensing capacitor 5. In this way, it is possible to detect whether there is a crack in the portion of the display panel 100 located around the mounting hole 1 by determining whether the detection signal can be obtained at the second crack detection line 32, which may warn and adjust the process in advance to avoid large loss subsequently.

The embodiments of the present disclosure do not limit the specific arrangement manner of the mutual-sensing capacitor 5, which may be selected and set according to actual needs.

In some embodiments, as shown in FIG. 3 and FIGS. 8 to 10, the mutual-sensing capacitor 5 surrounds at least a part of the mounting hole 1.

Figure 8:
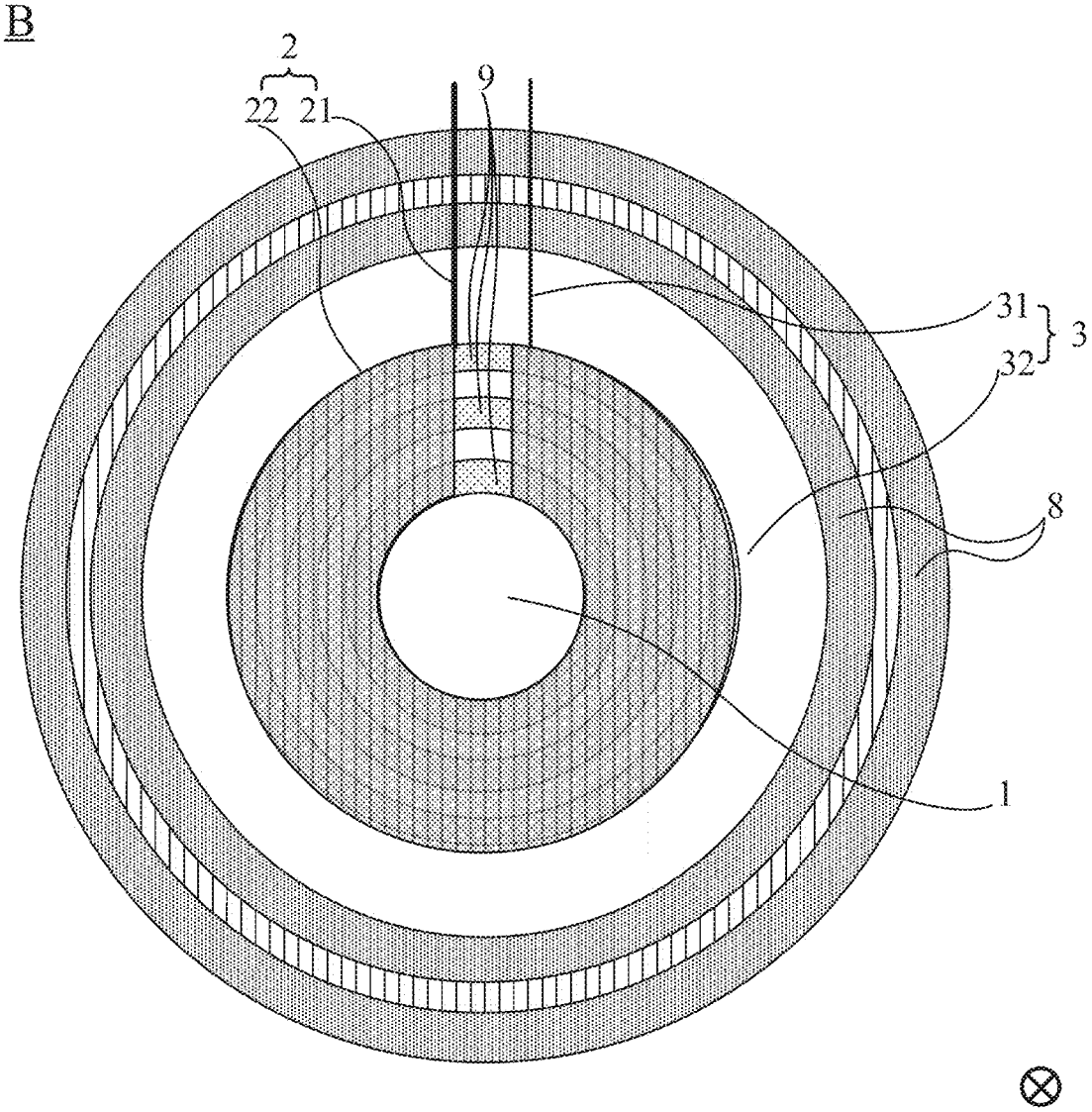
FIG. 8 is another enlarged view of the region B in the display panel shown in FIG. 2A.

In some examples, as shown in FIGS. 3 and 8, the mutual-sensing capacitor 5 may only surround a part of the mounting hole 1.

In a case where the mutual-sensing capacitor 5 surrounds the part of the mounting hole 1, arrangement manners of the first electrode 22 and the second electrode 32 are various, which may be selected and set according to actual needs.

For example, the first electrode 22 has a shape of an opening ring and surrounds a part of the mounting hole 1, and the second electrode 32 has a shape of an opening ring and surrounds the part of the mounting hole 1. The opening of the first electrode 22 and the opening of the second electrode 32 are opposite to each other. An area of the first electrode and an area of the second electrode may be, for example, the same. Portions of the mounting hole 1 surrounded by the two electrodes may be, for example, have the same area.

For another example, the first electrode 22 has a shape of an opening ring and surrounds a part of the mounting hole 1, and the second electrode 32 has a shape of a ring and surrounds the mounting hole 1. It will be understood that, in this case, although the second electrode 32 surrounds the entire mounting hole 1, only a portion directly opposite to the first electrode 22 can jointly form the effective mutual-sensing capacitor 5.

For yet another example, the second electrode 32 has a shape of an opening ring and surrounds a part of the mounting hole 1, and the first electrode 22 has a shape of a ring and surrounds the mounting hole 1. It will be understood that, in this case, although the first electrode 22 surrounds the entire mounting hole 1, only a portion directly opposite to the second electrode 32 can jointly form the effective mutual-sensing capacitor 5.

In these ways, a detection of a portion of the display panel 100 around the mounting hole 1 may be achieved.

Figure 9:
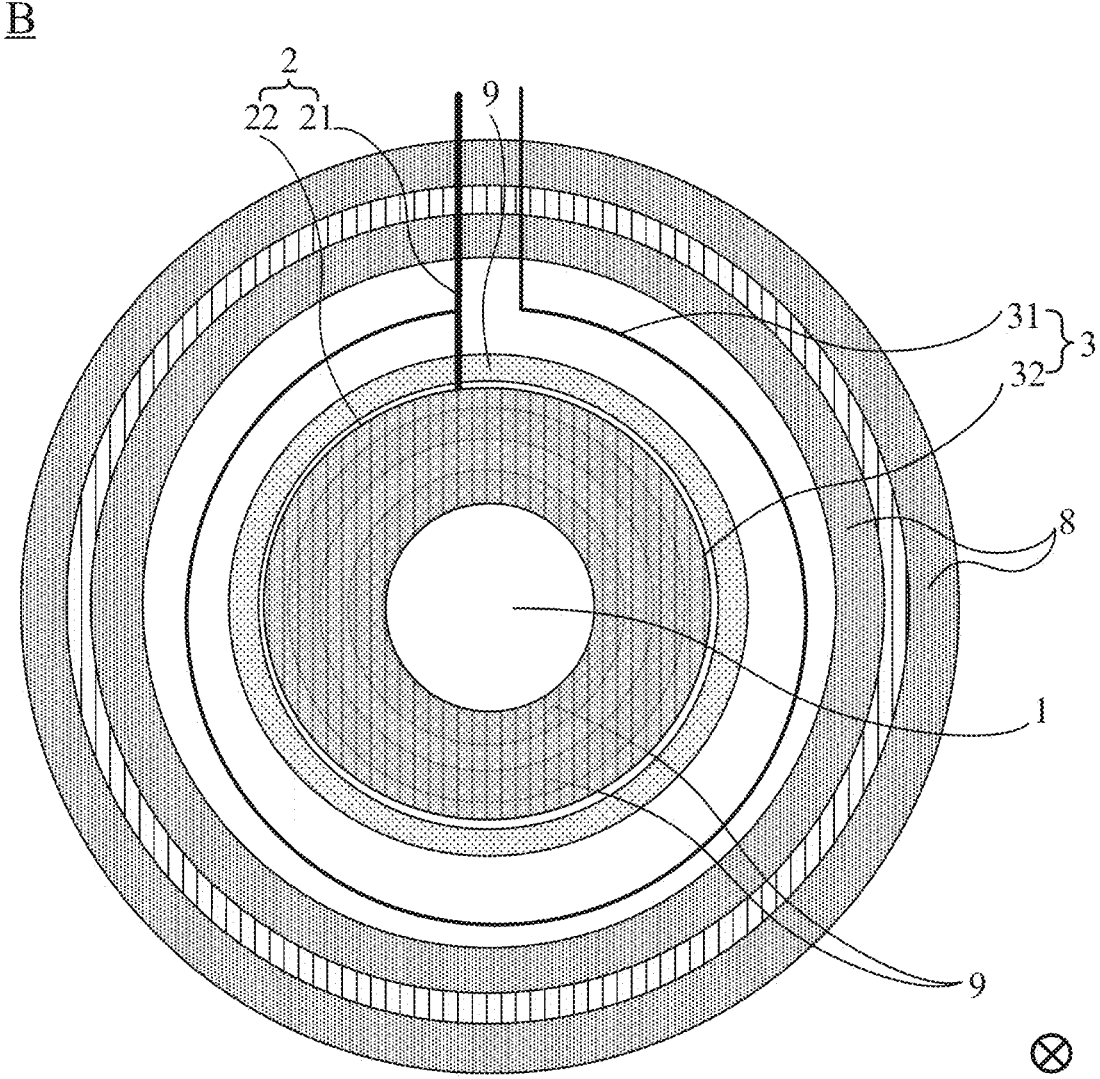
FIG. 9 is yet another enlarged view of the region B in the display panel shown in FIG. 2A.
Figure 10:
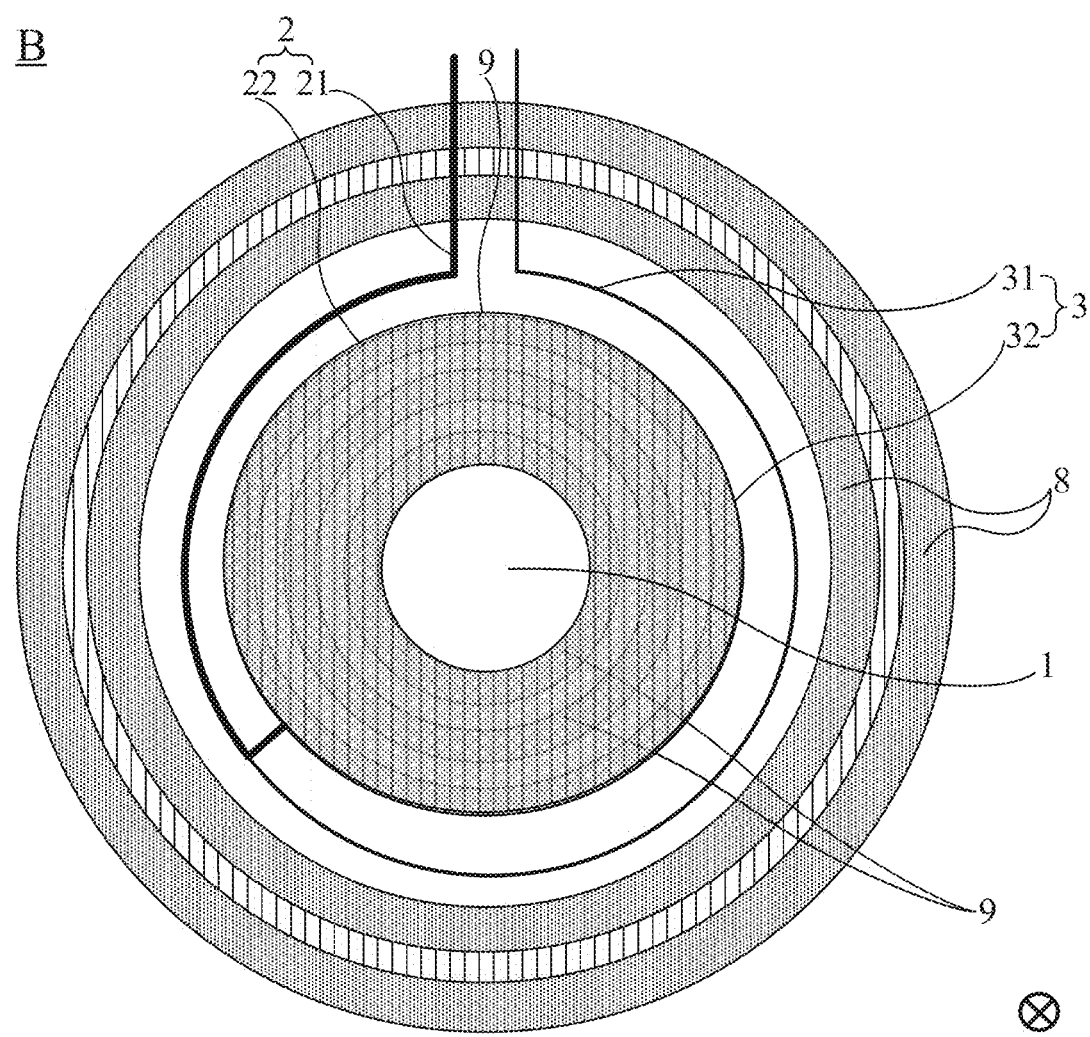
FIG. 10 is yet another enlarged view of the region B in the display panel shown in FIG. 2A.

In some other examples, as shown in FIGS. 9 and 10, the mutual-sensing capacitor 5 may also surround the entire mounting hole 1.

In a case where the mutual-sensing capacitor 5 surrounds the entire mounting hole 1, there may be the following arrangement manner.

For example, the first electrode 22 has a shape of a ring and surrounds the mounting hole 1, and the second electrode 32 has a shape of a ring and surrounds the mounting hole 1. In this way, a detection of a portion of the display panel 100 around the entire mounting hole 1 may be achieved, and a situation of missed detection may be avoided.

The embodiments of the present disclosure do not limit the specific arrangement manners of the first crack detection line 21 and the second crack detection line 31, which may be selected and set according to actual needs.

In some examples, as shown in FIG. 3 and FIGS. 8 to 10, one end of the first crack detection line 21 is connected to the first electrode 22, and the other end extends in a direction away from the first electrode 22. One end of the second crack detection line 31 is connected to the second electrode 32, and the other end extends in a direction away from the second electrode 32. In a direction perpendicular to a plane where the display panel 100 is located, i.e., in a thickness direction of the display panel 100 (as represented by the symbol ⊗ in FIGS. 3, 8 to 10), the first crack detection line 21 is non-overlapping with the second crack detection line 31.

By arranging the first crack detection line 21 being non-overlapping with the second crack detection line 31, it may be avoided that a capacitor is formed between the first crack detection line 21 and the second crack detection line 31, thereby interfering with the mutual-sensing capacitor 5.

For example, as shown in FIG. 8, both the first crack detection line 21 and the second crack detection line 31 do not surround the mounting hole 1, and extend in a direction away from the mutual-sensing capacitor 5, which may simplify the wiring layout and save materials.

In this case, it may be possible to detect whether there is a crack in the portion of the display panel 100 located around the mounting hole 1 by determining whether the detection signal is obtained.

For example, as shown in FIGS. 3, 9 and 10, the first crack detection line 21 surrounds at least a part of the mounting hole 1, and the first crack detection line 21 is located at a side of the mutual-sensing capacitor 5 away from the mounting hole 1, and/or, the second crack detection line 31 surrounds at least a part of the mounting hole 1, and the second crack detection line 31 is located at the side of the mutual-sensing capacitor 5 away from the mounting hole 1.

It may be understood that the above examples include but are not limited to the following situations.

For example, the first crack detection line 21 surrounds a part of the mounting hole 1, and the second crack detection line 31 surrounds the part of the mounting hole 1.

For another example, the first crack detection line 21 surrounds a part of the mounting hole 1, and the second crack detection line 31 surrounds the entire mounting hole 1.

For yet another example, the first crack detection line 21 surrounds the entire mounting hole 1, and the second crack detection line 31 surrounds a part of the mounting hole 1.

For yet another example, the first crack detection line 21 surrounds the entire mounting hole 1, and the second crack detection line 31 surrounds the entire mounting hole 1.

Based on some arrangement manners of the first crack detection line 21 and the second crack detection line 31, it is possible to achieve a detection of the portion of the display panel 100 that is around the mounting hole 1 and surrounded by the first crack detection line 21 and the second crack detection line 31.

In yet some other examples, as shown in FIG. 10, the first crack detection line 21 surrounds a part of the mounting hole 1, and the second crack detection line 31 surrounds another part of the mounting hole 1.

For example, as shown in FIG. 10, the first crack detection line 21 and the second crack detection line 31 may be connected to the mutual-sensing capacitor 5 at a same position, and after extending a certain distance in a direction away from the mutual-sensing capacitor 5, the first crack detection line 21 and the second crack detection line 31 surrounds parts of the mounting hole 1 in opposite directions. In this case, for example, in the direction perpendicular to the plane where the display panel 100 is located, the first crack detection line 21 is partially overlapped with the second crack detection line 31.

It will be understood that, as shown in FIG. 10, an overlapping portion of the first crack detection line 21 and the second crack detection line 31 is a portion that each of the first crack detection line 21 and the second crack detection line 31 extends for the certain distance in the direction away from the mutual-sensing capacitor 5.

Based on the arrangement manners, on a basis of ensuring that it is possible to detect whether there is a crack in the portion of the display panel 100 located around the mounting hole 1, the materials may be saved, the layout may be simplified, and the space may be saved.

It will be pointed out that a formula for calculating a magnitude of a capacitance C of a capacitor is that C is equal to $(\varepsilon r \times S)/(4\pi \times k \times d)$ ($C=(\varepsilon r \times S)/(4\pi \times k \times d)$), wherein $\varepsilon r$ represents a relative dielectric constant, which is related to materials of the upper and lower plates of the capacitor; S represents an overlapping area of the upper and lower plates, d represents a distance between the upper and lower plates, k represents an electrostatic force constant, and $4\pi$ is a constant.

In the mutual-sensing capacitor 5 of the present disclosure, materials of the first electrode and the second electrode are determined, that is, the relative dielectric constant is a constant value. A relative position of the first electrode 22 and the second electrode 32 is constant; that is, a distance between the first electrode 22 and the second electrode 32 is a constant value. That is, a magnitude of a capacitance of the mutual-sensing capacitor in the present application is related to an overlapping area S between the first electrode 22 and the second electrode 32.

Regarding the overlapping area S between the first electrode 22 and the second electrode 32, it can be seen from the formula that there is a direct proportional relationship between S and C. In a case where there is no crack in the portion of the display panel 100 located around the mounting hole 1, the capacitance C of the mutual-sensing capacitor 5 has the maximum value. In the case where there is a crack in the portion of the display panel 100 located around the mounting hole 1, there will be crack(s) in the first electrode 22 and/or the second electrode 32 correspondingly. In this case, an effective overlapping area S will decrease, and the value of the capacitance C of the mutual-sensing capacitor 5 will decrease correspondingly.

In a case where the crack detection line(s) (e.g., the first crack detection line 21 and/or the second crack detection line 31) surrounds at least a part of the mounting hole 1, since positions of the first crack detection line 21 and the second crack detection line 31 are constant, and there is the direct proportional relationship between the overlapping area S and the value of the capacitance C, an approximate position of the crack may be determined according to a proportional relationship between the reduced capacitance value and the maximum capacitance value by considering a position where the first crack detection line 21 and the first electrode 22 are connected or a position where the second crack detection line 31 and the second electrode 32 are connected as a reference position.

For example, if the capacitance is reduced to half of the maximum capacitance value, it can be seen that the effective overlapping area is also reduced to half of the maximum overlapping area. Therefore, a corresponding position that the overlapping area is reduced by half may be found by considering the position where the first crack detection line 21 and the first electrode 22 are connected or the position where the second crack detection line 31 and the second electrode 32 are connected as the reference position, and this corresponding position is a position where the crack is generated.

It will be pointed out that, in different examples, the maximum overlapping area between the first electrode 22 and the second electrode 32 may be different. In this case, the maximum capacitance value is also different. Thus, in different examples, it may be necessary to use different maximum capacitance values as standards to determine the position of the crack.

For example, in a case where the mutual-sensing capacitor 5 surrounds a part of the mounting hole 1, the overlapping area between the first electrode 22 and the second electrode 32 is S1. In a case where the mutual-sensing capacitor 5 surrounds the entire mounting hole 1, the overlapping area between the first electrode 22 and the second electrode 32 is S2. It will be understood that S1 is less than S2. Therefore, the maximum capacitance values in the above two cases are different. When detecting whether there is a crack in the portion of the display panel 100 located around the mounting hole 1, it is necessary to use the respective maximum capacitance value as the reference to make a determination.

It needs to be pointed out that, in a case where an alternating current is supplied to the mutual-sensing capacitor 5 through the first crack detection line 21 and the second crack detection line 31, a current may be generated among the first crack detection line 21, the second crack detection line 31 and the mutual-sensing capacitor 5.

In a case where there is no crack or the crack is small in the portion of the display panel 100 located around the mounting hole 1 (both the first crack detection line 21 and the second crack detection line 31 are not broken), a current signal may be input through one end of the first crack detection line 21, and the current signal may be output from one end of the second crack detection line 31. However, in a case where there is a crack in the portion of the display panel 100 located around the mounting hole 1 and the crack is relatively large (at least one of the first crack detection line 21, the second crack detection line 31, the first electrode 22, or the second electrode 32 is completely broken), the current signal cannot be transmitted through the second crack detection line 31. Therefore, it is possible to detect whether there is a crack in the portion of the display panel 100 located around the mounting hole 1 according to whether the current signal can be detected through the second crack detection line 31, and to help determine whether the crack is large.

In some embodiments, as shown in FIGS. 11A to 12B, the display panel 100 further includes a touch structure 7 located at a side of the encapsulation layer 61. The touch structure 7 includes a first touch layer 71, a second insulating isolation layer 72 and a second touch layer 73 that are sequentially stacked.

The touch structure 7 is of a variety of structures, which may be selected and set according to actual needs.

Figure 11A:
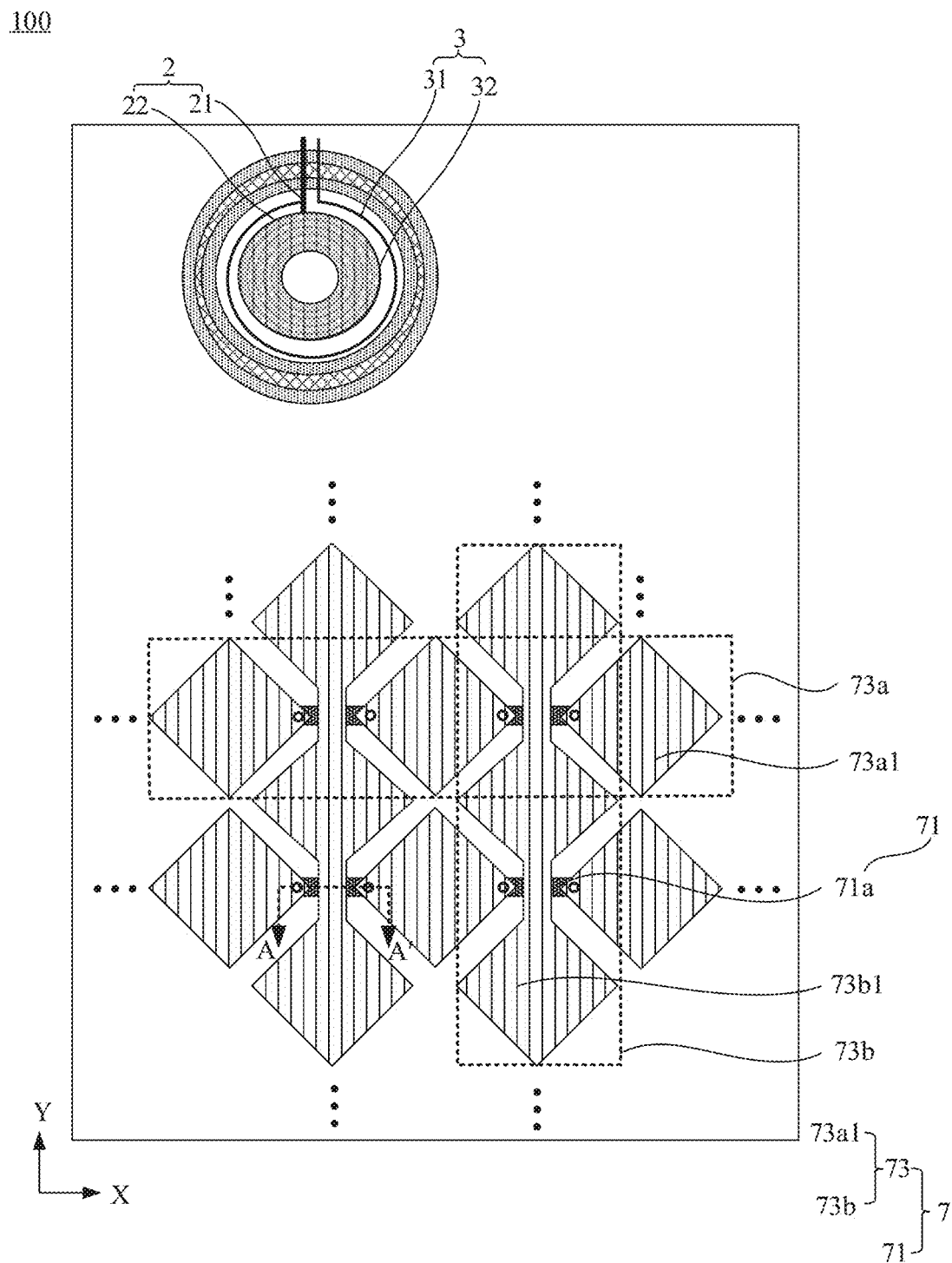
FIG. 11A is a structural diagram of another display panel, in accordance with some embodiments of the present disclosure.
Figure 11B:
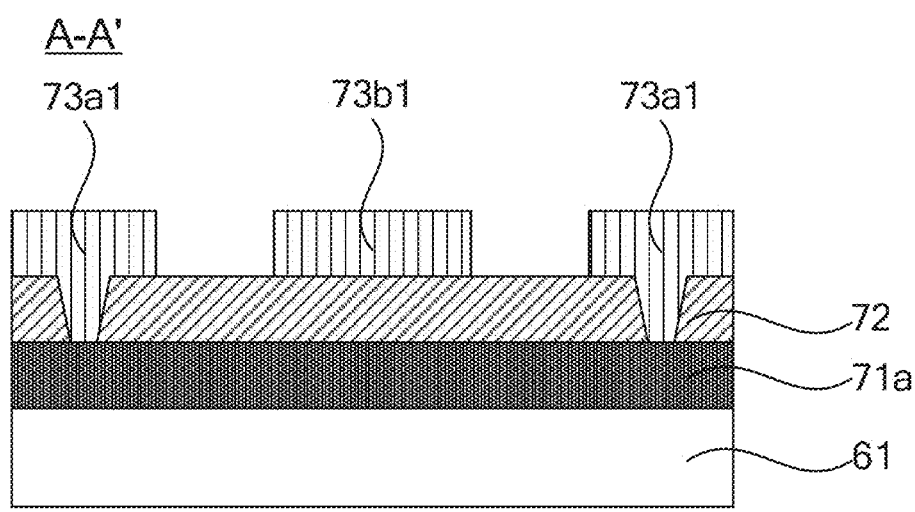
FIG. 11B is a sectional view of the display panel shown in FIG. 11A taken along the line A-A'.

In some examples, as shown in FIGS. 11A and 11B, the first touch layer 71 includes a plurality of metal bridges 71a.

The second touch layer 73 includes a plurality of lines of first touch sub-electrodes 73a1 and a plurality of second touch electrodes 73b each extending in a second direction Y. Each line includes a plurality of first touch sub-electrodes 73a1 arranged in a first direction X. In a same line, any two adjacent first touch sub-electrodes 73a1 and a respective metal bridge 71a are electrically connected through a via hole, so that a first touch electrode 73a is formed. The second touch electrode 73b includes a plurality of second touch sub-electrodes 73b1, and the plurality of second touch sub-electrodes 73b1 are integrally connected to form the second touch electrode 73b.

Here, the first direction X is, for example, a row direction, and the second direction Y is, for example, a column direction, that is, the first direction X and the second direction Y intersect each other in the plane where the display panel 100 is located. In other examples, an included angle between the first direction X and the second direction Y may be an acute angle or an obtuse angle, which is not limited in the embodiments of the present disclosure and may be adjusted accordingly according to a setting manner of the patterns of these touch electrodes.

For example, as shown in FIG. 11A, the first touch sub-electrodes 73a1 and the second touch electrodes 73b each have a grid shape. That is, each touch sub-electrode is composed of a plurality of conductive wires which are arranged crosswise.

Figure 12A:
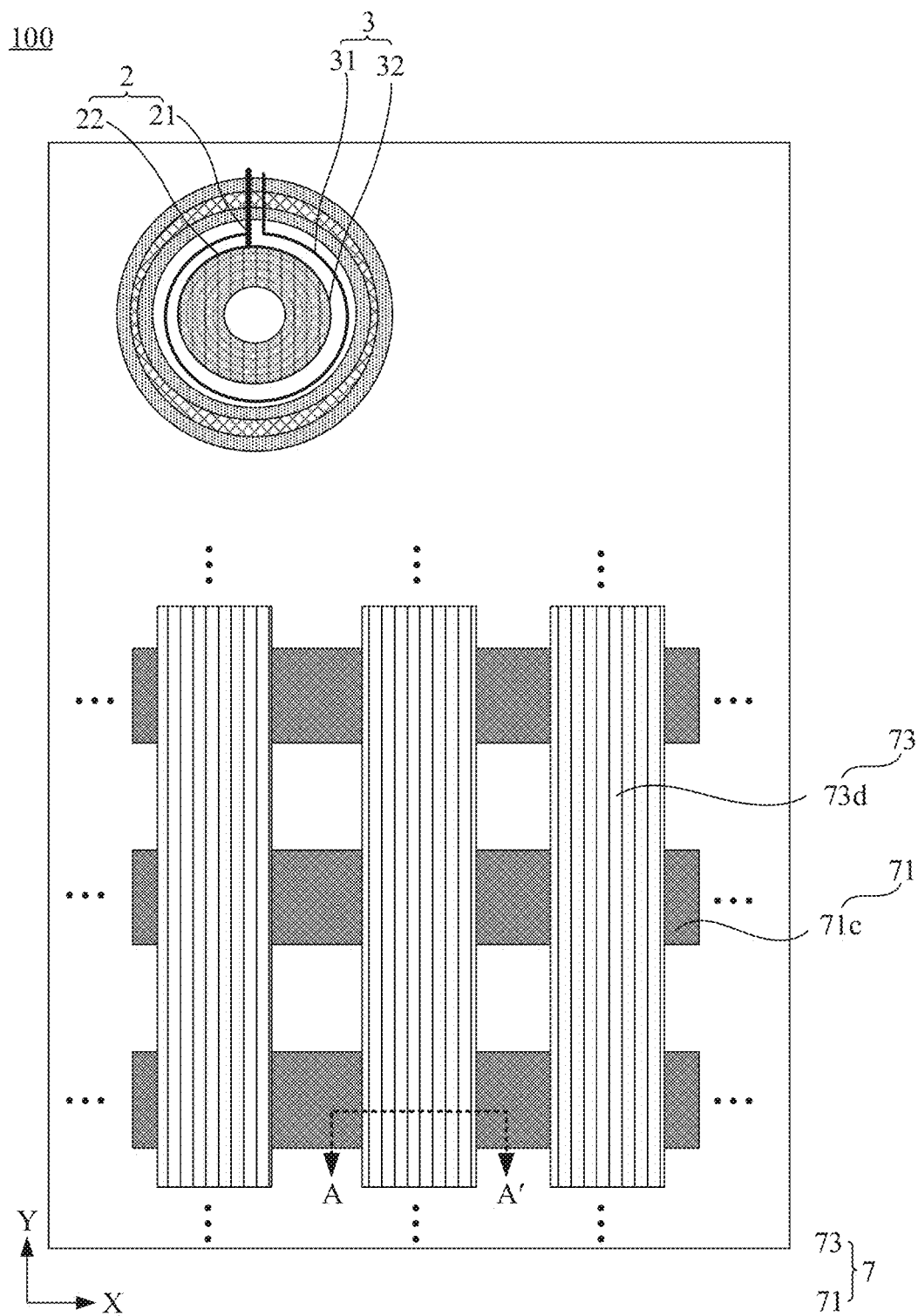
FIG. 12A is a structural diagram of yet another display panel, in accordance with some embodiments of the present disclosure.
Figure 12B:
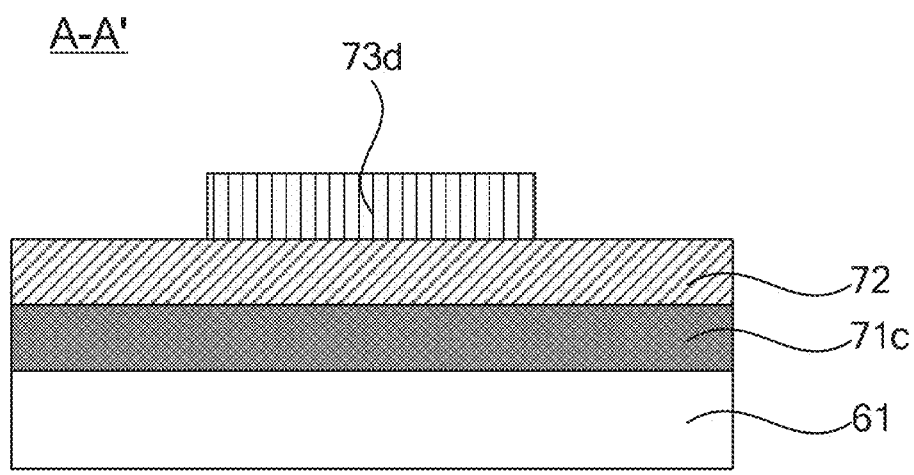
FIG. 12B is a sectional view of the display panel shown in FIG. 12A taken along the line A-A'.

In some other examples, as shown in FIG. 12A, the first touch layer 71 includes a plurality of third touch electrodes 71c each extending in the first direction X. The second touch layer 73 includes a plurality of fourth touch electrodes 73d each extending in the second direction Y.

For example, the third touch electrodes 71c and the fourth touch electrodes 73d have a grid shape. That is, each touch sub-electrode is composed of a plurality of conductive wires which are arranged crosswise.

The touch structure 7 is disposed on the encapsulation layer 61. Compared with an on-cell touch sensor panel (TSP), a thickness of the display panel 100 may be reduced, and in a case where the display panel 100 is a foldable display panel, it is beneficial to reduce the difficulty of folding and a size of a bezel of the display panel 100.

In some examples, as shown in FIG. 3 and FIGS. 8 to 10, the display panel 100 further includes at least one first isolation dam 8 surrounding the mounting hole 1. The first isolation dam 8 is located at the side of the mutual-sensing capacitor 5 away from the mounting hole 1. A part of the first crack detection line 21 and a part of the second crack detection line 31 extend from a side of the first isolation dam 8 proximate to the mounting hole 1 to a side of the first isolation dam 8 away from the mounting hole 1.

For example, a part of the first crack detection line 21 and a part of the second crack detection line 31 both continue to extend across the first isolation dam 8 to facilitate interaction with the outside.

For example, the first isolation dam 8 is used to isolate a region around the mounting hole 1 from other regions of the display panel 100. For example, the first isolation dam 8 may also be used for dust prevention, and water vapor prevention.

The embodiments of the present disclosure do not limit a cross-sectional pattern of the first isolation dam 8 in the direction perpendicular to the plane where the display panel 100 is located, which may be set according to actual needs.

For example, as shown in FIG. 3 and FIGS. 8 to 10, in the direction perpendicular to the plane where the display panel 100 is located, the cross-sectional pattern of the first isolation dam 8 is a trapezoid.

In a case where there are a plurality of first isolation dams 8, a relationship between thicknesses of the plurality of first isolation dams 8 is not limited, which may be set according to actual needs.

For example, as shown in FIG. 3 and FIGS. 8 to 10, in the case where there are a plurality of first isolation dams 8, a thickness of a first isolation dam 8 proximate to the mounting hole 1 is greater than a thickness of a first isolation dam 8 away from the mounting hole 1.

In this way, a good isolation effect may be achieved through a height difference among different first isolation dams 8.

Here, the thickness of the first isolation dam 8 refers to a distance between a bottom side and a top side of the cross-sectional pattern of the first isolation dam 8 in the direction perpendicular to the plane where the display panel 100 is located, i.e., the height of the first isolation dam 8.

In an example, as shown in FIG. 1, there is only one crack detection line 2' which is generally disposed in a same layer as the second touch layer.

However, in a process of forming the touch structure, in a case where there is one first isolation dam 3', the first isolation dam 3' is convex compared to its surrounding region, and there is a level difference between the first isolation dam 3' and the surrounding region. Therefore, in a process of forming the second touch layer through a patterning process, photoresist used in the patterning process in a region around the first isolation dam 3' is relatively thick, and a part of the photoresist is likely to remain after exposure and development. As a result, the region around the first isolation dam 3' is not completely etched and there are conductive material (e.g., a metal material) residues 4'. In a case where there are a plurality of first isolation dams 3', since a gap between adjacent first isolation dams 3' is very small (e.g., 20 μm), a part of photoresist is also likely to remain in the gap, which results in incomplete etching and presence of the conductive material residues 4'. Therefore, the crack detection line 2' in the above mentioned example is likely to form a connection with the conductive material residues 4', so that both ends of the crack detection line 2' are easily short-circuited due to the conductive material residues 4'. As a result, the crack detection line 2' in the above mentioned example may not be used to detect whether there is a crack in the portion of the display panel located around the mounting hole 1'.

While, the first electrode 22 and the second electrode 32 in the mutual-sensing capacitor 5 in the embodiments of the present disclosure are located in different layers, and the first electrode 22 and the second electrode 32 are separated by the first insulating isolation layer 4 located therebetween. Correspondingly, the first crack detection line 21 and the second crack detection line 31 are also located in different layers, and the first crack detection line 21 and the second crack detection line 31 are separated by the first insulating isolation layer 4 located therebetween.

In this way, the first electrode 22 and the second electrode 32 may be prevented from being short-circuited, and the first crack detection line 21 and the second crack detection line 31 may also be prevented from being short-circuited. As a result, the problem of short circuit is avoided.

Figure 6:
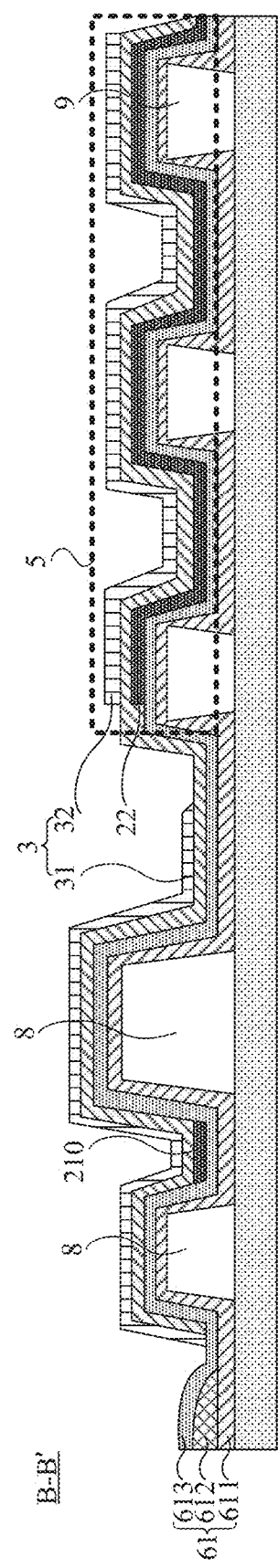
FIG. 6 is a sectional view of the region B in the display panel shown in FIG. 3 taken along the line B-B'.
Figure 7:
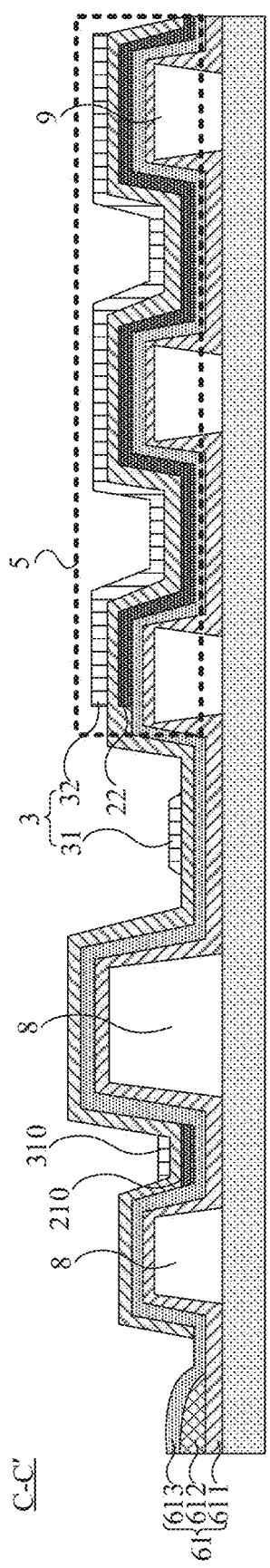
FIG. 7 is a sectional view of the region B in the display panel shown in FIG. 3 taken along the line C-C'.

It will be noted that, as shown in FIGS. 6, 7 and 9, there may be both metal residues (as represented by the reference numeral 210 in FIGS. 6 and 7) formed during a fabrication of the first touch layer 71 and metal residues (as represented by the reference numeral 310 in FIG. 7) formed during a fabrication of the second touch layer 73 between adjacent first isolation dams 8. The two metal residues can also be separated by the first insulating isolation layer 4 to achieve insulation, thereby preventing the first crack detection line 21 and the second crack detection line 31 from being short-circuited through the metal residues.

Therefore, when it is detected whether there is a crack in the portion of the display panel 100 located around the mounting hole 1, the solutions provided in the embodiments of the present disclosure have better stability, and may effectively avoid the problem of short circuit and the missed detection.

In some examples, the first conductive layer 2 and the first touch layer 71 are disposed in a same layer, the first insulating isolation layer 4 and the second insulating isolation layer 72 are disposed in a same layer, and the second conductive layer 3 and the second touch layer 73 are disposed in a same layer.

It will be noted that, that A and B are disposed in a same layer means that A and B are formed by a process as follows: a film is formed first by using a same film-forming process and then a patterning process is performed on the film by using a same mask to form a layer structure with specific patterns including A and B. Depending on different specific patterns, the patterning process may include multiple exposure, development or etching processes, and the specific patterns may be continuous or discontinuous, and these specific patterns may also be at different heights or have different thicknesses. In this way, the first conductive layer 2 and the first touch layer 71 may be formed simultaneously in one patterning process, the first insulating isolation layer 4 and the second insulating isolation layer 72 may also be formed simultaneously in one patterning process, and the second conductive layer 3 and the second touch layer 73 may also be formed simultaneously in one patterning process, which is beneficial to simplify a fabrication process of the display panel 100.

It will be understood that, in a case where the touch structure 7 is of the structure shown in FIG. 11A, the first crack detection line 21, the first electrode 22, and the metal bridges 71a are disposed in a same layer. In this way, the first crack detection line 21, the first electrode 22, and the metal bridges 71a may be formed simultaneously in one patterning process. The second crack detection line 31, the second electrode 32, the first touch sub-electrodes 73a1, and the second touch electrodes 73b are disposed in a same layer. In this way, the second crack detection line 31, the second electrode 32, the first touch sub-electrodes 73a1, and the second touch electrodes 73b may be formed simultaneously in one patterning process.

In a case where the touch structure 7 is of the structure shown in FIG. 12A, the first crack detection line 21, the first electrode 22, and the third touch electrodes 71c are disposed in a same layer. In this way, the first crack detection line 21, the first electrode 22, and the third touch electrodes 71c may be formed simultaneously in one patterning process. The second crack detection line 31, the second electrode 32, and the fourth touch electrodes 73d are disposed in a same layer. In this way, the second crack detection line 31, the second electrode 32, and the fourth touch electrodes 73d may be formed simultaneously in one patterning process.

In some examples, as shown in FIG. 3 and FIGS. 8 to 10, the display panel 100 further includes at least one second isolation dam 9 surrounding the mounting hole 1. The second isolation dam 9 is located at a side of the first isolation dam 8 proximate to the mounting hole 1.

The embodiments of the present disclosure do not limit a cross-sectional pattern of the second isolation dam 9 in the direction perpendicular to the plane where the display panel 100 is located, which may be set according to actual needs.

Figure 4:
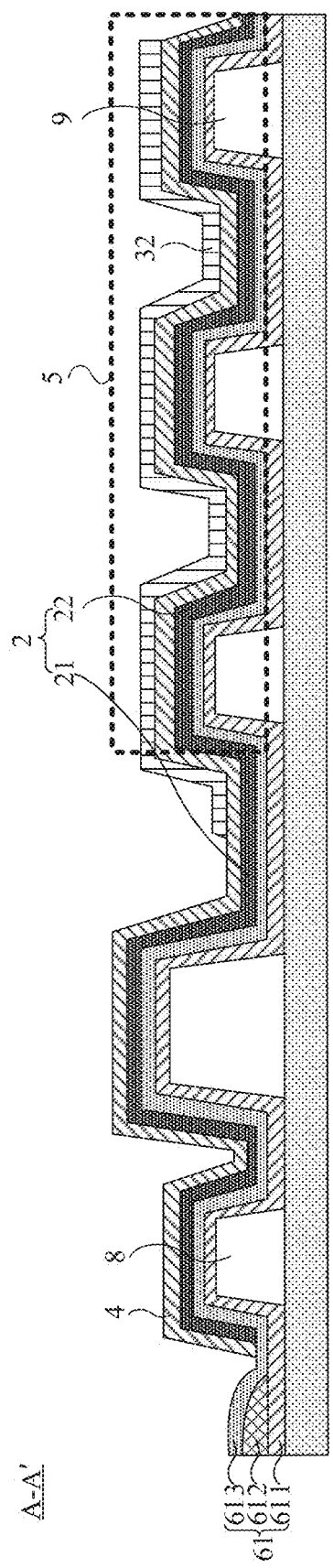
FIG. 4 is a sectional view of the region B in the display panel shown in FIG. 3 taken along the line A-A'.

For example, as shown in FIG. 4, in the direction perpendicular to the plane where the display panel 100 is located, the cross-sectional pattern of the second isolation dam 9 is a trapezoid.

For example, in the direction perpendicular to the plane where the display panel 100 is located, the cross-sectional pattern of the second isolation dam 9 is inverted trapezoidal-shaped or I-shaped.

The cross-sectional pattern of the second isolation dam 9 is inverted trapezoidal-shaped or I-shaped, which may achieve the similar effect. Therefore, as shown in FIGS. 5 to 7, description is made by considering an example in which the cross-sectional pattern of the second isolation dam 9 is inverted trapezoidal-shaped in the direction perpendicular to the plane where the display panel 100 is located.

Those skilled in the art will understand that, the second inorganic layer 613 and the first inorganic layer 611 are sequentially stacked at a side of the second isolation dam 9. The organic layer 612 is blocked by the first isolation dam 8 and will not be formed at a side where the second isolation dam 9 is located.

Since in the direction perpendicular to the plane where the display panel 100 is located, the cross-sectional pattern of the second isolation dam 9 is inverted trapezoidal-shaped, that is, two sides of the cross-sectional pattern substantially parallel to the base, one side relatively further away from the substrate being larger than the other side, in a process of forming the second inorganic layer 613 and the first inorganic layer 611, regions of the second inorganic layer 613 and the first inorganic layer 611 located at both sides of the second isolation dam 9 will be deformed, and are unevenly connected here. In this way, even there are cracks in the second inorganic layer 613 and the first inorganic layer 611 in a process of punching holes, the transmission of a stress at a position where the second inorganic layer 613 and the first inorganic layer 611 are deformed will be blocked, which prevents the cracks from extending inside the display panel 100 away from the mounting hole 1.

In some examples, as shown in FIGS. 9 and 10, both the first electrode 21 and the second electrode 31 cover at least a part of the second isolation dams 9.

For example, as shown in FIG. 9, the first electrode 21 and the second electrode 31 only cover a part of the second isolation dams 9. In this case, an overlapping area between the first electrode 21 and the second electrode 31 is S3.

For another example, as shown in FIG. 10, the first electrode 21 and the second electrode 31 completely cover the second isolation dams 9. In this case, the overlapping area between the first electrode 21 and the second electrode 31 is S4.

It may be understood that S3 is less than S4. Therefore, the maximum capacitance values in the above two cases are also different, and the maximum capacitance value in each case needs to be used as the standard to determine whether there is a crack in the portion of the display panel 100 located around the mounting hole 1.

Figure 14:
FIG. 14 is a structural diagram of another display apparatus, in accordance with some embodiments of the present disclosure.

In some embodiments, as shown in FIG. 14, a display apparatus 1000 is provided, including the display panel 100 described in any one of the embodiments.

The beneficial effects that can be achieved by the display apparatus 1000 provided in some embodiments of the present disclosure are the same as the beneficial effects that can be achieved by the display panel 100 provided in some of the embodiments, which will not be repeated here.

For example, as shown in FIG. 14, the display apparatus 1000 may be any device that is capable of displaying an image whether in motion (e.g., a video) or stationary (e.g., a static image), and whether literal or graphical. More specifically, it is contemplated that the described embodiments may be implemented in or associated with a variety of electronic devices. The variety of electronic devices may include (but not limit to), for example, mobile telephones, wireless devices, personal digital assistants (PDA), hand-held or portable computers, global positioning system (GPS) receivers/navigators, cameras, moving picture experts group (MP4) video players, video cameras, game consoles, watches, clocks, calculators, TV monitors, computer monitors, car displays (e.g., odometer displays), navigators, cockpit controllers and/or displays, camera view displays (e.g., rear view camera display in a vehicle), electronic photos, electronic billboards or signages, projectors, building structures, packaging and aesthetic structures (e.g., a display for an image of a piece of jewelry).

Figure 13:
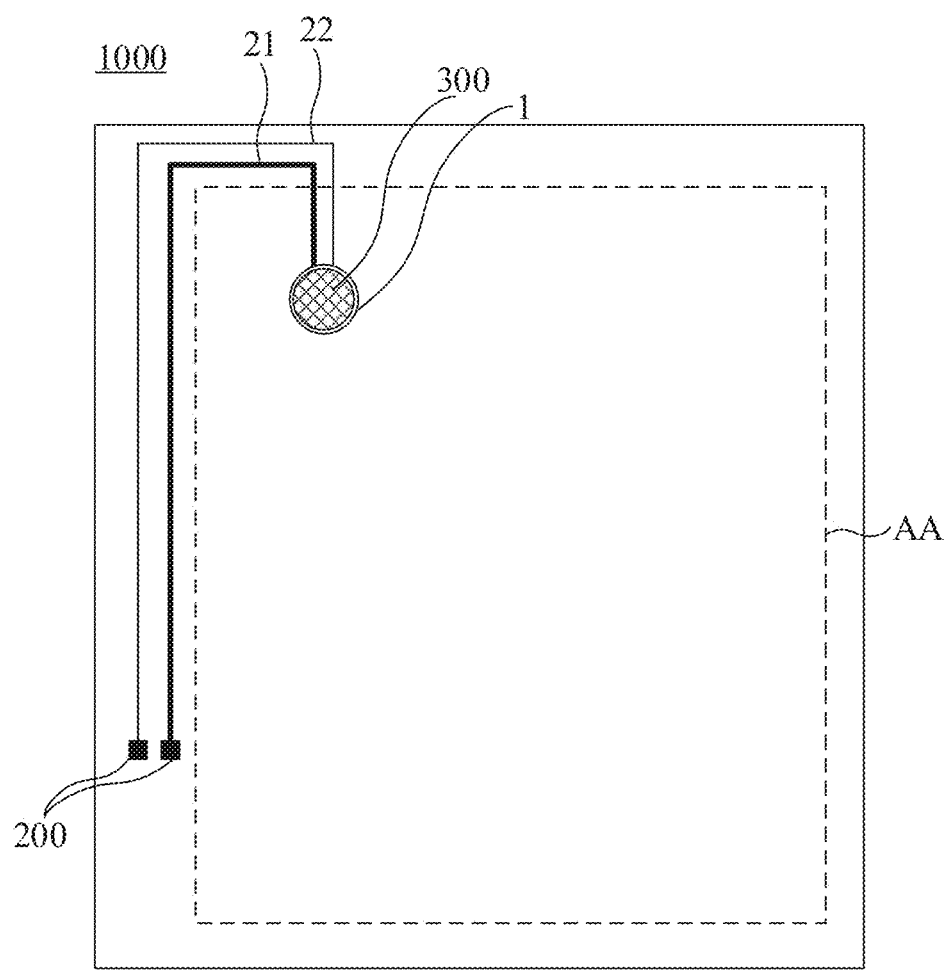
FIG. 13 is a structural diagram of a display apparatus, in accordance with some embodiments of the present disclosure.

In some examples, as shown in FIG. 13, the display apparatus 1000 further includes at least two pads 200, one end of the first crack detection line 21 away from the first electrode 22 is electrically connected to one pad 200, and one end of the second crack detection line 31 away from the second electrode 32 is electrically connected to another pad 200.

On this basis, the first crack detection line 21 may receive the detection signal through the pad 200 connected to the first crack detection line 21, and the second crack detection line 31 may output the detection signal through the pad 200 connected to the second crack detection line 31, so as to detect whether there is a crack in the portion of the display panel 100 located around the mounting hole 1 by determining the output detection signal.

For example, whether there is a crack in the portion around the mounting hole 1 may be determined by detecting a signal transmitted on the corresponding pad 200, and further, an approximate location of the crack may be determined. Or the display device 1000 further includes an integrated circuit (IC) electrically connected to the pads 200, and the IC determines whether there is a crack in the portion around the mounting hole 1 and further determines an approximate position of the crack.

In some examples, as shown in FIG. 13, the display apparatus 1000 further includes an optical device 300 located in the mounting hole 1 of the display panel 100.

The optical device 300 may be a device such as a camera, a fingerprint recognition sensor, which is not specifically limited herein.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A display panel, having a mounting hole, the display panel comprising:
    a first conductive layer including a first crack detection line and a first electrode connected to each other;
    a second conductive layer including a second crack detection line and a second electrode connected to each other;
    a first insulating isolation layer located between the first conductive layer and the second conductive layer; and
    at least one first isolation dam surrounding the mounting hole;
    wherein the first electrode and the second electrode constitute a capacitor;
    the capacitor is disposed outside of the mounting hole, and configured to detect whether there is a crack in a portion of the display panel located around the mounting hole;
    wherein the first isolation dam is located at a side of the capacitor away from the mounting hole; and
    a part of the first crack detection line and a part of the second crack detection line extend from a side of the first isolation dam proximate to the mounting hole to a side of the first isolation dam away from the mounting hole.

2. The display panel according to claim 1, wherein the capacitor surrounds at least a part of the mounting hole.

3. The display panel according to claim 2, wherein the first electrode has a shape of ring and surrounds the mounting hole; or
the first electrode has a shape of an opening ring and surrounds a part of the mounting hole.

4. The display panel according to claim 2, wherein the second electrode has a shape of a ring and surrounds the mounting hole; or
the second electrode has a shape of an opening ring and surrounds a part of the mounting hole.

5. The display panel according to claim 1, wherein one end of the first crack detection line is connected to the first electrode, and another end extends in a direction away from the first electrode;
one end of the second crack detection line is connected to the second electrode, and another end extends in a direction away from the second electrode; and
in a direction perpendicular to a plane where the display panel is located, the first crack detection line is non-overlapping with the second crack detection line.

6. The display panel according to claim 1, wherein the first crack detection line surrounds at least a part of the mounting hole, and located at a side of the capacitor away from the mounting hole.

7. The display panel according to claim 1, wherein the second crack detection line surrounds at least a part of the mounting hole, and located at a side of the capacitor away from the mounting hole.

8. The display panel according to claim 1, wherein the first crack detection line surrounds a part of the mounting hole, and the second crack detection line surrounds another part of the mounting hole.

9. The display panel according to claim 8, wherein in a direction perpendicular to a plane where the display panel is located, the first crack detection line is partially overlapped with the second crack detection line.

10. The display panel according to claim 1, wherein in a direction perpendicular to a plane where the display panel is located, a cross-sectional pattern of the first isolation dam is a trapezoid; and
the first isolation dam includes a plurality of first isolation dams, a thickness of a first isolation dam proximate to the mounting hole is greater than a thickness of a first isolation dam away from the mounting hole.

11. The display panel according to claim 1, further comprising at least one second isolation dam surrounding the mounting hole;
wherein the second isolation dam is located at the side of the first isolation dam proximate to the mounting hole.

12. The display panel according to claim 11, wherein in a direction perpendicular to a plane where the display panel is located, a cross-sectional pattern of the second isolation dam is inverted trapezoidal-shaped or I-shaped.

13. The display panel according to claim 11, wherein the first electrode and the second electrode both cover at least a part of the second isolation dam.

14. The display panel according to claim 1, further comprising:
a display substrate including an encapsulation layer; and
a touch structure located at a side of the encapsulation layer, the touch structure including:
a first touch layer, a second insulating isolation layer, and a second touch layer that are sequentially stacked.

15. The display panel according to claim 14, wherein the first conductive layer and the first touch layer are disposed in a same layer;
the first insulating isolation layer and the second insulating isolation layer are disposed in a same layer; and
the second conductive layer and the second touch layer are disposed in a same layer.

16. A display apparatus, comprising the display panel according to claim 1.

17. The display apparatus according to claim 16, further comprising:
two pads, an end of the first crack detection line away from the first electrode being electrically connected to one of the pads, and an end of the second crack detection line away from the second electrode being electrically connected to another one of the pads.

18. The display apparatus according to claim 16, further comprising an optical device located in the mounting hole of the display panel.

19. A display panel, having a mounting hole, the display panel comprising:
a first conductive layer including a first crack detection line and a first electrode connected to each other;
a second conductive layer including a second crack detection line and a second electrode connected to each other;
a first insulating isolation layer located between the first conductive layer and the second conductive layer;
wherein the first electrode and the second electrode constitute a capacitor; the capacitor is disposed outside of the mounting hole, and configured to detect whether there is a crack in a portion of the display panel located around the mounting hole;
the first crack detection line surrounds a part of the mounting hole, and the second crack detection line surrounds another part of the mounting hole; and
in a direction perpendicular to a plane where the display panel is located, the first crack detection line is partially overlapped with the second crack detection line.

20. A display apparatus, comprising the display panel according to claim 19.

* * * * *